(12) United States Patent
Ludwig et al.

(10) Patent No.: US 7,590,778 B2
(45) Date of Patent: Sep. 15, 2009

(54) USING OPERATION CODES TO CONTROL A DECODER'S USE OF A BUFFER TO GENERATE DATA FROM AN INPUT DATA STREAM INTO AN OUTPUT DATA STREAM

(75) Inventors: Steven G. Ludwig, Boulder, CO (US); Joan La Verne Mitchell, Longmont, CO (US)

(73) Assignee: International Business Machines Corporation, Armonk, NY (US)

( * ) Notice: Subject to any disclaimer, the term of this patent is extended or adjusted under 35 U.S.C. 154(b) by 238 days.

(21) Appl. No.: 11/424,527

(22) Filed: Jun. 15, 2006

(65) Prior Publication Data

US 2008/0005429 A1    Jan. 3, 2008

(51) Int. Cl.
*G06F 5/00* (2006.01)
*G06F 13/12* (2006.01)
*H03M 7/30* (2006.01)

(52) U.S. Cl. .............................. 710/56; 710/50; 710/52; 710/68; 341/50

(58) Field of Classification Search ..................... 710/56
See application file for complete search history.

(56) References Cited

U.S. PATENT DOCUMENTS

| | | | |
|---|---|---|---|
| 4,355,306 A | | 10/1982 | Mitchell |
| 5,345,316 A | | 9/1994 | Ozaki et al. |
| 5,384,646 A | | 1/1995 | Godshalk et al. |
| 5,576,765 A | * | 11/1996 | Cheney et al. ......... 375/240.02 |
| 5,668,641 A | | 9/1997 | Tsukamoto et al. |
| 5,704,022 A | | 12/1997 | Ethington et al. |
| 5,717,394 A | * | 2/1998 | Schwartz et al. ............ 341/51 |
| 5,760,716 A | * | 6/1998 | Mathews et al. ............ 341/50 |
| 5,825,991 A | | 10/1998 | Plakosh et al. |
| 5,845,239 A | * | 12/1998 | Laczko, Sr. et al. ......... 704/200 |
| 5,984,446 A | | 11/1999 | Silverbrook |

(Continued)

FOREIGN PATENT DOCUMENTS

JP    11-342647    12/1999

(Continued)

OTHER PUBLICATIONS

D.J. Craft, "A Fast Hardware Data Compression Algorithm and Some Algorithm Extensions", IBM Journal of Research and Development, vol. 42, No. 6, Nov. 1998, pp. 733-745.

(Continued)

*Primary Examiner*—Henry W. H. Tsai
*Assistant Examiner*—Kris Rhu
(74) *Attorney, Agent, or Firm*—David W. Victor; Konrad Raynes & Victor LLP

(57) ABSTRACT

Provided are a method, system, and article of manufacture for using operation codes to control a decoder's use of a buffer to generate data from an input data stream into an output data stream. An encoder generates an input data stream for a decoder comprising at least one operation code and compressed data for an output device. The at least one operation code instructs the decoder on how to use a buffer when processing the input data stream. The decoder receives the input data stream, processes the data in the input data stream to perform an operation with respect to the buffer according to the at least one operation code, and decodes the compressed data into decompressed data to send to an output data stream to the output device.

11 Claims, 6 Drawing Sheets

U.S. PATENT DOCUMENTS

| | | | |
|---|---|---|---|
| 6,002,847 | A | 12/1999 | Silverbrook |
| 6,031,624 | A | 2/2000 | Murphy |
| 6,707,948 | B1 | 3/2004 | Cosman et al. |
| 7,162,416 | B2 | 1/2007 | Morton et al. |
| 2005/0283547 | A1* | 12/2005 | Parry et al. .................... 710/52 |
| 2006/0020475 | A1* | 1/2006 | Morton et al. .............. 704/500 |
| 2006/0210108 | A1* | 9/2006 | Brunk et al. ................ 382/100 |

OTHER PUBLICATIONS

R.B. Arps, et al., "A Multi-Purpose VLSI Chip for Adaptive Data Compression on Bilevel Images", IBM Journal of Research and Development, vol. 32, No. 6, Nov. 1988, pp. 775-795.

K.M. Marks, "A JBIG-ABIC Compression Engine for Digital Document Processing", IBM Journal of Research and Development, vol. 42, No. 6, Nov. 1998, pp. 753-758.

R.L. Henley, et al., "Concurrent PostScript Rasterizers Based High Throughput Color Printer Architecture", IBM Corporation, IBM Technical Disclosure Bulletin, vol. 40, No. 3, Mar. 1997 pp. 141-150.

US Application entitled "Using Operation Codes to Control a Decoder to Generate Data From an Input Data Stream Into an Output Data Stream", Serial No. not yet assigned, filed Jan. 15, 2006, by inventors J.L. Mitchell and S.G. Ludwig.

* cited by examiner

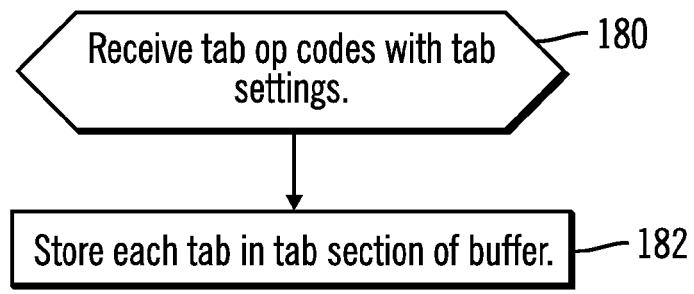
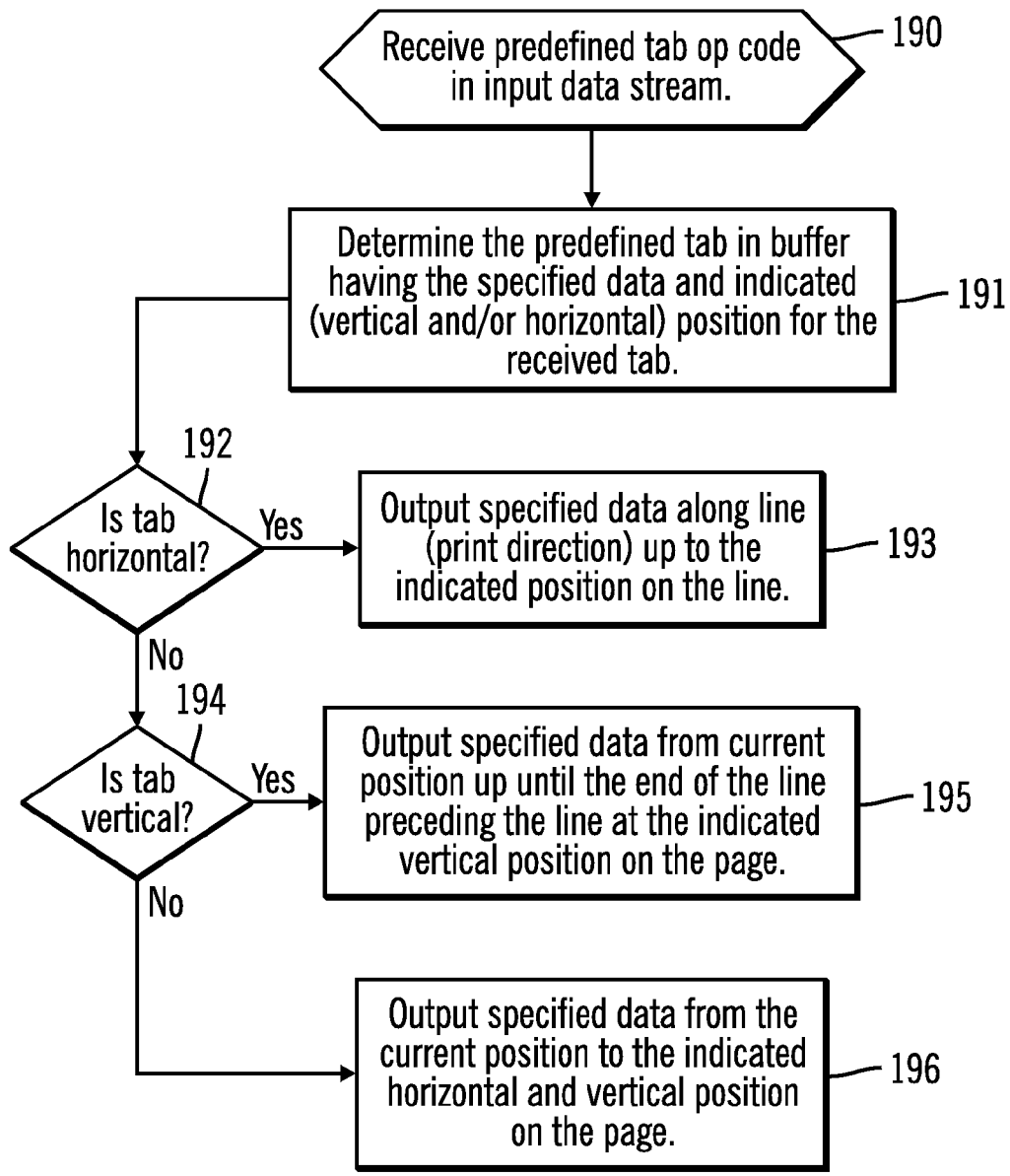

USING OPERATION CODES TO CONTROL A DECODER'S USE OF A BUFFER TO GENERATE DATA FROM AN INPUT DATA STREAM INTO AN OUTPUT DATA STREAM

BACKGROUND OF THE INVENTION

1. Field of the Invention

The present invention relates to a method, system, and program for using operation codes to control a decoder's use of a buffer to generate data from an input data stream into an output data stream.

2. Description of the Related Art

High speed printers require that data be sent fast enough to continuously supply data to the print engines. For instance, high speed printers can print more than 1,000 pages per minute at 600 dpi (dots per inch). Future printers are expected to run faster and at higher (e.g. 1200 dpi) resolutions. The minimum bandwidth to a 1 bit/spot print engine at 600 dpi for 1,000 pages per minute (1,000 pages per minute×min/60 seconds×8.5 inches×11 inches×600 dpi×600 dpi×1 bit) is 561 Mbits/sec. Moreover, 2,000 pages per minute can be achieved by having two print engines, one each for the front and the back of paper and controlling them independently.

Continuous form printers also need data continuously supplied because they often do not stop or slow down gracefully. One way that this is accomplished is to store multiple pages ready for printing. More pages may be stored to make available for printing if the pages are compressed. However, a decoder must decompress pages at a fast enough rate to continuously supply decompressed data to the printer. Decoders store decoded data in buffers. The buffered data is then sent to the printer to render. Sometimes the decoder also uses the buffer as a history buffer.

There is a need in the art for improved techniques to supply compressed data to a printer that can be decompressed at a fast enough rate to supply to the print engines producing output at a high speed.

SUMMARY

Provided are a method, system, and article of manufacture for using operation codes to control a decoder's use of a buffer to generate data from an input data stream into an output data stream. An encoder generates an input data stream for a decoder comprising at least one operation code and compressed data for an output device. The at least one operation code instructs the decoder on how to use a buffer when processing the input data stream. The decoder receives the input data stream, processes the data in the input data stream to perform an operation with respect to the buffer according to the at least one operation code, and decodes the compressed data into decompressed data to send to an output data stream to the output device.

In a further embodiment, the at least one operation code includes parameters indicating a counter size and a counter value. The decoder processes the data in the input data stream according to the at least one operation code by creating a counter in the buffer having the size indicated in the parameters, setting the created counter to the counter value indicated in the parameters, and using the created counter to repeat an operation with respect to data from the input data stream in the buffer a number of times indicated in the counter.

In a further embodiment, the at least one operation code comprises at least one operation code instructing the decoder to add an accompanying pattern of data to the buffer at an addressable location without outputting the received pattern to the output data stream. The decoder processes the data in the input data stream according to the at least one operation code by storing the pattern in the buffer in response to the operation code to add the accompanying pattern to the buffer. The decoder further receives the address of one pattern in the buffer and outputs the pattern at the received address in the buffer to the output data stream.

In a further embodiment, the at least one operation code comprises a first and a second operation codes. The first operation code instructs the decoder to load or not to load data in the input data stream following the received first operation code into the buffer and the second operation code instructs the decoder to output or not output decompressed data decompressed from the input data stream following the received second operation code into the output data stream to the output device.

In a further embodiment, the first and second operation codes may be received together to simultaneously start or stop adding subsequent data from the input data stream to the buffer and to start or stop outputting subsequent data from the input data stream to the output data stream to the output device.

In a further embodiment, the first operation code instructs the decoder to load data from the input data stream to a designated address in the buffer.

In a further embodiment, the at least one operation code includes a first group of at least one operation code instructing the decoder to set a start and an end addresses of a circular buffer in the buffer and a second group of at least one operation code instructing the decoder to output data in the circular buffer between the set start and end addresses an indicated number of times into the output data stream.

In a further embodiment, the second group of at least one operation code instructs the decoder to output data starting from a designated address between the set start and end addresses in the circular buffer. The decoder processes the data in the input data stream according to the at least one operation code by outputting data between the designated address and the end address in the circular buffer and between start address and an address before the designated address the indicated number of times.

In a further embodiment, the at least one operation code comprises an operation code instructing the decoder to add a command to the buffer at an addressable location. The decoder processes the data in the input data stream according to the at least one operation code by storing the command in the buffer. The decoder further receives from the encoder the address of one command in the buffer to execute and executes the command at the received address in the buffer to perform operations with respect to one of the input data stream or data in the buffer to output to the output device.

In a further embodiment, the at least one operation code comprises operation codes instructing the decoder to add a parameter to a first part of the buffer for use with one operation code subsequently sent by the encoder to the decoder; add a pattern of data to a second part of the buffer at an address, wherein the encoder subsequently sends at least one operation code to the decoder to output to the output data stream the pattern at the address in the second part of the buffer a designated number of times; control how the decoder buffers data from the input data stream in a third part of the buffer; and add a command to an address in a fourth part of the buffer, wherein the encoder subsequently sends the address of the command to cause the decoder to execute the command at the received address in the fourth part of the buffer.

In a further embodiment, the at least one operation code comprises an operation code instructing the decoder to add halftone data generated from a halftone dither matrix to the buffer at an address. The decoder processes the data in the input data stream according to the at least one operation code by storing the halftone data in the buffer and further performs receiving a halftone operation code to output the halftone data in the buffer.

In a further embodiment, the halftone operation code designates a start location in the halftone data in the buffer. The decoder outputs halftone data from the designated start location in the buffer to shift a halftone pattern represented by the halftone data.

BRIEF DESCRIPTION OF THE DRAWINGS

FIG. 7 illustrates an embodiment of operations performed by a decoder to store tabs in a buffer.

FIG. 8 illustrates an embodiment of operations performed by a decoder to process tabs in the input data stream.

DETAILED DESCRIPTION

Figure 1:
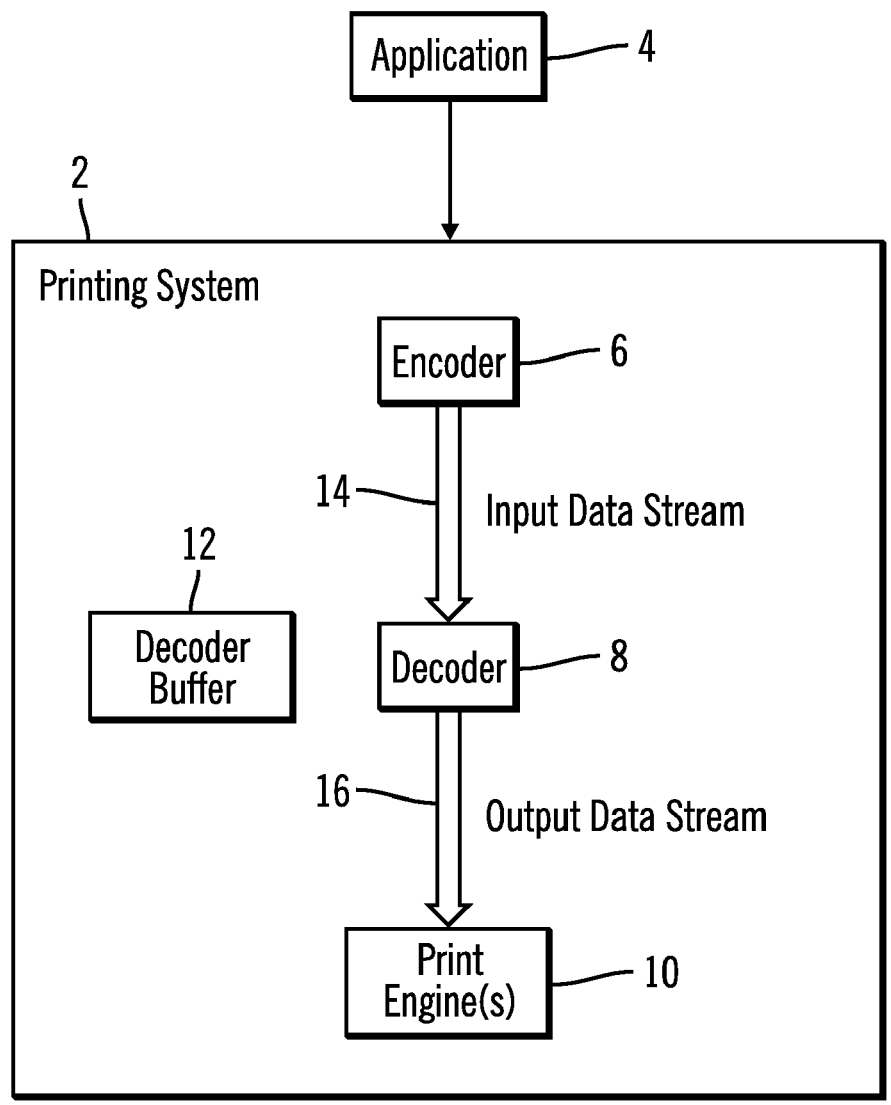
FIG. 1 illustrates an embodiment of a printing environment.

FIG. 1 illustrates an embodiment of a printer system 2 in communication with an application 4 that provides a stream of data to output, such as a print stream. The application 4 may be implemented in a system external to the printer system 2 in communication via a direct connection or over a network. The printer system 2 includes an encoder 6 to compress and encode the data from the application 4. Alternatively, the encoder 6 may be located in the system including the application 4 or external to the printer system 2. The encoder 6 transmits an input data stream 14 to the decoder 8 to decompress/decode and supply directly to one or more print engines 10 to output. The decoder 8 may be connected via a high speed bus to the print engines 10 so that decompressed data may be immediately provided to the print engines 10, which may comprise the print heads and other components to produce the output. The print engines 10 may comprise a high speed printer or other output device known in the art. The decoder 8 utilizes a decoder buffer 12 to store commands, information and data (decompressed or compressed) to decode and/or send to the print engines 10.

Figure 2:
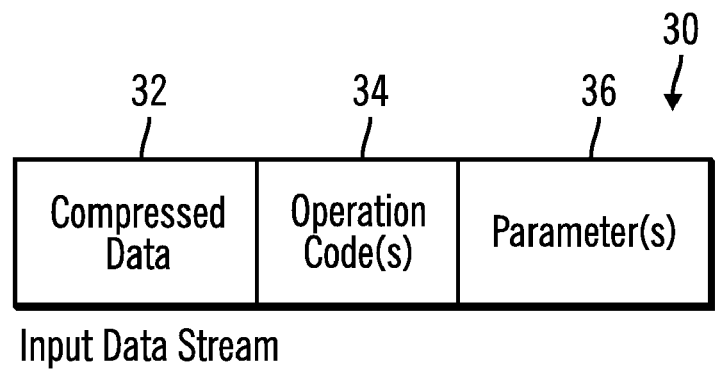
FIG. 2 illustrates an embodiment of content in an input data stream.

FIG. 2 illustrates an embodiment of a section 30 of the input data stream 14 the encoder 6 sends to the decoder 8 to decompress/decode. The input data stream section 30 includes a compressed data stream 32 and zero or more operation codes (op codes) 34 and zero or more parameters 36 for each op code 34. The operation codes instruct the decoder 8 on how to process data (compressed or uncompressed) included in the input data stream section 30. In one embodiment, the operation codes 34 and parameters 36 are uncompressed.

The encoder 6 may use operation codes to instruct the decoder 8 on the width of the input and output data stream 16 at the decoder 8. An INWIDTH operation code instructs the decoder 8 on the number of bits in the width of parallel input data stream 14 to the decoder 8. This configures the decoder 8 to expect and perform decompression operations with respect to an input data stream 14 having the width specified with the INWIDTH operation code or a default width, e.g., 1 byte, if no INWIDTH set width is provided.

The OUTWIDTH operation code specifies a number of bits in the decoder's 8 parallel output path. This means that all non-compressed data that goes into the buffer 12 or the output data stream 16 to the print engines 10 is the size specified by the parameter provided with the OUTWIDTH operation code or a default length if no OUTWIDTH is provided. The decoder 8 may then adjust its application of the decompression algorithm to the input data stream 16 to take into account the specified input and output width from the encoder 6.

The encoder 6 may specify an algorithm (ALG) operation code with a parameter identifying no compression or a compression algorithm for the decoder 8 to use to decompress the data. In this way, the decoder 8 may be capable of decoding compressed data using one of multiple compression algorithms, e.g., a zero/white skipping algorithm, a byte repetition algorithm, etc. Upon receiving a specified compression algorithm, the decoder 8 decompresses the subsequent compressed data received in the input data stream sections 30 using the specified compression algorithm until a different compression algorithm is specified in a subsequent algorithm operation code 34. Additionally, the decoder 8 processes the data in the input data stream 14 as uncompressed if the algorithm operation code indicates "no compression". The encoder 6 may further specify a length in bytes for the selected compression algorithm, such that the decoder 8 would revert to using a previously used compression algorithm after decoding for the specified length.

The encoder 6 may also specify a UNIT operation code that indicates a number of bits for a pixel or dot in the decompressed output data stream. This allows the decoder 8 to delineate between pixels in the stream, such that the bits defined in a UNIT are processed together in an operation. Further, certain decompression and output operations are performed with respect to the unit whose size may be specified by the UNIT operation code or set to a default value in the absence of a unit size specified by a UNIT operation code.

The encoder 6 may also provide a counter operation code that includes as parameters a size of the counter and a value. In response to such an operation code, the decoder 8 creates a counter in the decoder buffer 12 having the specified size and value. The encoder 6 may then instruct the decoder 8 to perform an operation, such as outputting data or padding the output with specified pixels, for a number of times specified by the value set in the counter. The decoder 8 may decrement the counter upon performing an iteration of the operation, e.g., outputting a buffered pattern of data, and stop the iterations when the counter reaches zero. By allowing the counter size to be set, space in the decoder buffer 12 is not wasted on a counter size that is larger than needed for the values to which the counter will be set. In this way, the counter size is set to accommodate just the maximum value to which the counter is set.

The encoder 6 may provide a FILL_DATA operation code to instruct the decoder 8 to load a pattern of data into the buffer 12 and then submit an OUTPUT_FILL command to instruct the decoder 8 to output the data loaded with the FILL_DATA command a number of specified times. The encoder 6 may specify the number of times to output the specified data by identifying a counter previously defined to the decoder 8 or provide the number of times. This allows the encoder 6 to send once a pattern of data that the decoder 8 outputs multiple times and a counter operation code to instruct the decoder 8 to output the data the number of times specified by the counter.

The encoder 6 may provide a NOOP operation code that instructs the decoder 8 to pad the compressed data in the buffer 12 in order to align the compressed data in the buffer 12.

The encoder 6 may further provide an operation code to instruct the decoder 8 to set the position for the tabs, which the decoder 8 stores in the buffer 12 at addressable locations. A tab specifies the number of spaces to skip or sets boundaries/ margins. In one embodiment, a tab is used to preset locations in the printer. A tab can specify locations, such as margins, both in the horizontal as well as the vertical directions. The horizontal direction is oriented along the print direction and the vertical direction is oriented orthogonal to the print direction and along subsequent lines of printing. When the encoder 6 provides tab operation codes in the input data stream 14, then the decoder 8 can look up the tab in the buffer 12 to determine the indicated position up to which specified data is outputted into the output data stream 16 before outputting further decompressed data. Specified data may have been specified before receiving the tab in the input data stream or may be specified in the tab. Thus, when a tab appears in the input data stream 14, the decoder 8 outputs specified data, such as white data, up to the indicated position in the line (horizontal tab) or the indicated vertical position on the page. In one embodiment, if the tab indicates a vertical position, then the decoder 8 may output the specified data through the end of the line immediately preceding the line at the vertical position. Alternatively, the decoder 8 can output specified data through the end of the line at the vertical position. In this way, the encoder 6 sends the tab settings once, and then the decoder 8 applies the tabs settings when the predefined tab subsequently appears in the input data stream 14.

If the buffer 12 maintains multiple tab settings, then upon processing a predefined tab in the input data stream 14, the decoder 8 outputs specified data to the vertical or horizontal position indicated in the processed tab. In this way, the decompressed data following the tab is outputted following the padding of the specified data for the preceding tab. If the operation code from the encoder 6 defines a negative tab, then the decoder 8 outputs specified data until the output position pointer is positive, then the tabs can be used to capture scrolling through a bigger picture. The encoder 6 may change the buffered tab values if the location of the output at tabbed locations is to be changed. If the background of the output is not white but some other color, then the specified data outputted for a tab, i.e., padded data, may be a specified color, i.e., colored pixels, such as the color of the background.

The encoder 6 may further provide a mask operation code that indicates margins to apply to each line of data being outputted into the output data stream, such that the decoder 8 will output specified data from the edge of the line until the margin and then start outputting data at the left margin and until the right margin specified by the mask. The decoder 8 may merge a line of output data with the margin settings maintained in the buffer 12.

The encoder 6 may further provide a print offset operation code that contains a shift amount for the hardware before it starts to print at all on the page.

Figure 3:
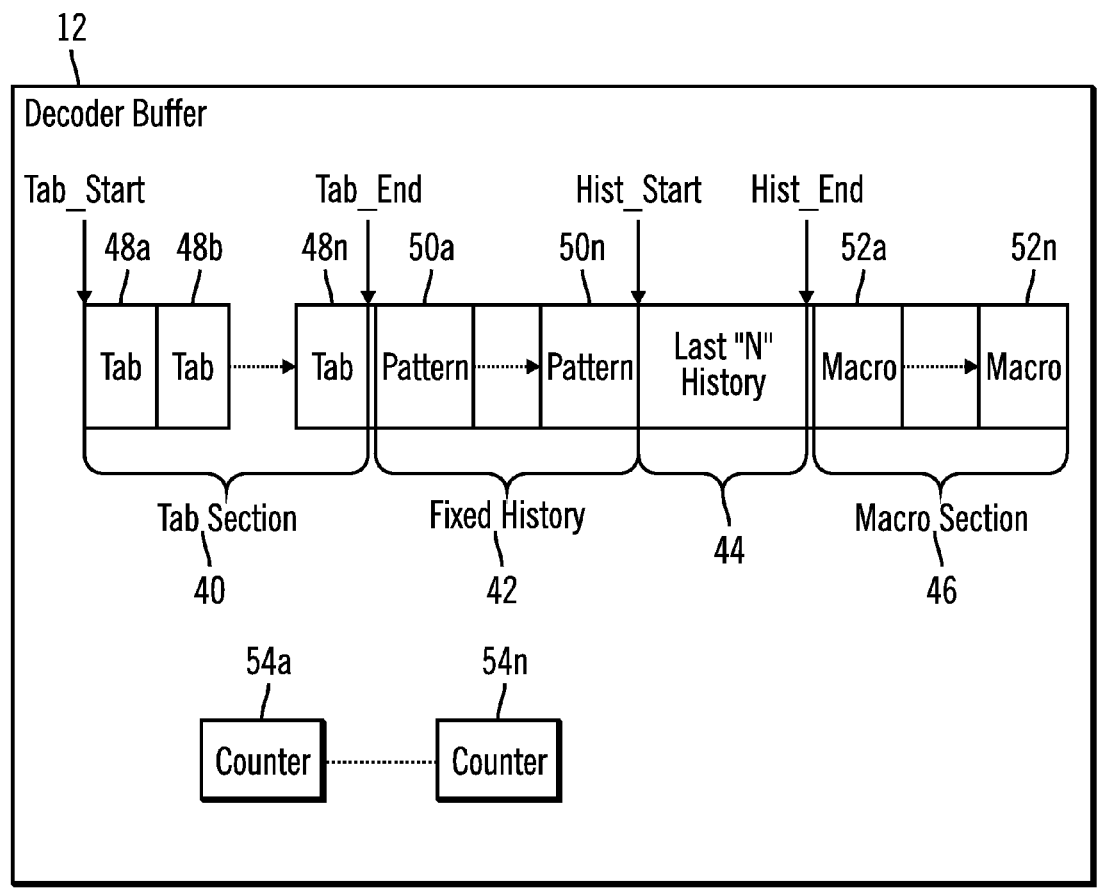
FIG. 3 illustrates an embodiment of content stored in a decoder buffer.

FIG. 3 illustrates an embodiment of information the decoder 8 maintains in the decoder buffer 12. The buffer 12 includes four sections, a tab section 40, a fixed history section 42, a "Last N" history section 44, and a macro section 46. The tab section 40 includes tab settings 48$a$, 48$b$... 48$n$ communicated from the encoder 6 that the decoder stores in the tab section 40. Each tab setting 48$a$ ... 48$n$ indicates a location in the line for a horizontal tab or along the vertical axis (line) of the page for a vertical tab up to which specified data is outputted before outputting the decompressed output stream. The tab settings 48$a$, 48$b$...48$n$ may be stored in tabs section 40 ordered according to the start position on a line of output data. The tab_start and tab_end indicate the start and end of the tab section 40 of the buffer 12.

In one embodiment, the tabs may be ordered in memory according to their indicated position to which the specified data is outputted. When the decoder 8 receives a tab in the input data stream 14, for a horizontal tab, the decoder 8 may use the horizontal tab having an indicated position that is the closest following position to the current position or, for a vertical tab, use the vertical tab having an indicated position that is at a line that is the closest following line to the current line at which data is being outputted. In an alternative embodiment, the operation code may specify a tab identifier or memory address of a tab 48$a$... 48$n$ in the tab section 40 to use. Further, a tab may specify both a vertical and a horizontal position to instruct the decoder 8 to output the specified data up to the indicated horizontal and vertical positions on the page. The encoder 6 may use a tab identifier or memory address to specify a horizontal and vertical tab to use.

The fixed history section 42 includes one or more patterns 50$a$ ... 50$n$ that the encoder 6 provides to the decoder 8 to store at addresses in the buffer 12 known to the encoder 6. The encoder 6 may then submit an operation code to instruct the decoder 8 to output the pattern 50$a$ ... 50$n$ a fixed number of times into the output data stream 16. The patterns 50$a$ ... 50$n$ may be stored in compressed or decompressed form. If the pattern 50$a$ ... 50$n$ is stored in the buffer 12 compressed, then the decoder 8 decompress before outputting into the output data stream 16. In this way, the encoder 6 need not repeatedly transmit the patterns for each instance of the pattern to repeat into the output data stream 16, but need only transmit the pattern 50$a$ ... 50$n$ once, and then provide an operation code and the address or variable name of the pattern 50$a$ ... 50$n$ to output an indicated number of times.

The patterns 50$a$...50$n$ in the fixed history section 42 may each comprise a circular buffer with a separate start and end so that the encoder 6 may instruct the decoder 8 to decode or output data in each pattern 50$a$ ... 50$n$ from any point between the start and end of the circular buffer comprising a pattern 50$a$...50$n$. Further, the patterns 50$a$...5O$n$ may also include data created using a halftone dither matrix.

The "last N" history section 44 includes the last N pixels of data (uncompressed or compressed) that have been outputted into the output data stream 16. The encoder 6 may use certain operation codes to instruct the decoder 8 to stop and start enqueuing data outputted into the output data stream 16 into the "last N" history buffer 44. The buffer 44 may comprise a circular buffer having a Hist_Start and Hist_End pointers pointing to the start and end of the buffer, respectively. The data in the "last N" history section 44 may comprise compressed or decompressed data.

In one embodiment, the encoder 6 may provide operation codes to the decoder 8 instructing the decoder 8 to either stop (STOP_HISTORY) storing uncompressed data in the "last N" history buffer 44 following the operation command, to start (LOAD_HISTORY) loading decompressed data from the encoder 6 into the "last N" history buffer 44, and/or to stop (STOP_OUTPUT) and start (START_OUTPUT) outputting data following the instruction from the encoder 6 to the output data stream 16. For instance, the encoder 6 may instruct the decoder 8 to not buffer certain data or not output certain data to the output data stream 16. The operation codes may specify both types of commands in one operation code or multiple operation codes. For instance, different operation codes may be used to stop or start placing data following the operation code into the "last N" history buffer 44 and other operation codes may be used to stop or start outputting data received in the input data stream 14 into the output data stream 16. Further, such combined instructions may be combined into a single operation code. For instance, a LOAD_HISTORY_ONLY command may instruct the decoder 8 to load the data from the input data stream 14 following this operation code into the "last N" history buffer 44 without outputting any of the data into the output data stream 16. Only upon receiving the START_OUTPUT command would the decoder 8 output the decompressed data received following this operation code to the output data stream 16.

The operation code to load data into the "last N" history buffer 44 may indicate an address at which to start loading data and a counter of a number of units of data to load. The encoder 6 may define the bit size of a unit that the decoder 8 operates upon. Further, the operation code to output the data from the "last N" history buffer 44 may specify a start address from where to start outputting data and a count of a number of units to output.

The encoder 6 may also define the size of the "last N" history buffer 44 through an operation code. The encoder 6 may further define the start (HIST_START) and end (HIST_END) addresses in the buffer 12 of the "last N" history buffer 44.

The encoder 6 may instruct the decoder 8 through an operation code to output all or a segment of the data in the "last N" history buffer 44. For instance, if the "last N" history buffer 44 comprises a circular buffer with a start and an end pointers, then the operation code may instruct the decoder 8 to output the data between the start and end pointers a number of times specified in a previously sent counter. The operation code may further designate a point to begin outputting data from the buffer between the start and end pointers, such that the decoder 8 outputs data from the designated start address in the "last N" history buffer 44 to the end pointer, and then from the start pointer to the entry in the circular buffer preceding the designated start address.

The macro section 46 includes macros 52a . . . 52n that the encoder 6 has provided to the decoder 8 to store in the buffer 12. The encoder 6 may then provide an address of a macro 52a . . . 52n with an operation code to instruct the decoder 8 to execute the stored macro 52a . . . 52n.

The buffer 12 further includes counters 54a . . . 54n the decoder 8 initialized in response to operation codes from the encoder 6 instructing the decoder 8 to create counters having a defined length and initial value for use in further decompression operations provided by the encoder 6.

In one embodiment, the data stored as patterns 50a . . . 50n in the fixed history 42 or the "last N" history buffer 44 may comprise data generated from a halftone dither matrix representing a halftone pattern. Thus, the output for a line of data may comprise halftone data. In a further embodiment, the encoder 6 may instruct the decoder 8 to start outputting halftone data from a point within the halftone matrix to shift the halftoning pattern.

The sections 40, 42, 44, and 46 of the buffer 12 may be arranged in a different order in the buffer 12 than shown in FIG. 3 or at non-contiguous address locations in the buffer 12. Further, the lengths of the sections 40, 42, 44, and 46 may be varied by the encoder 6 depending on the amount of data needed for each section.

Figure 4:
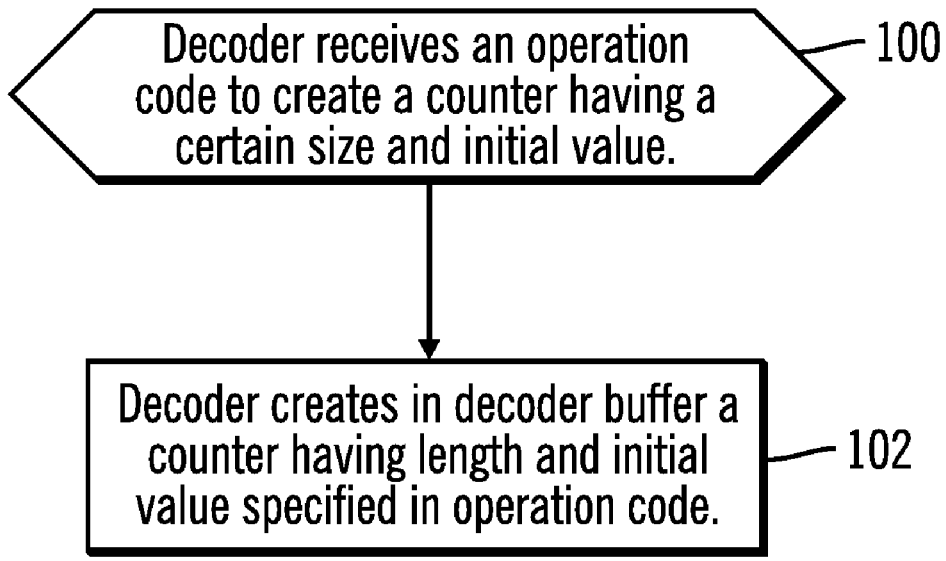
FIG. 4 illustrates an embodiment of operations performed by a decoder to create a counter.

FIG. 4 illustrates an embodiment of operations performed by the decoder 8 to create a counter 54a . . . 54n. Upon receiving (at block 100) an operation code to create a counter having a certain size and initial value from the encoder 6, the decoder 8 creates (at block 102) in the decoder buffer a counter 54a . . . 54n having length and initial value specified in operation code. The encoder 6 may then refer to this counter by specifying the address or some other identifier of the counter 54a . . . 54n for the decoder 8 to use for an operation with respect to the buffer 12 or output data stream 16.

Figure 5:
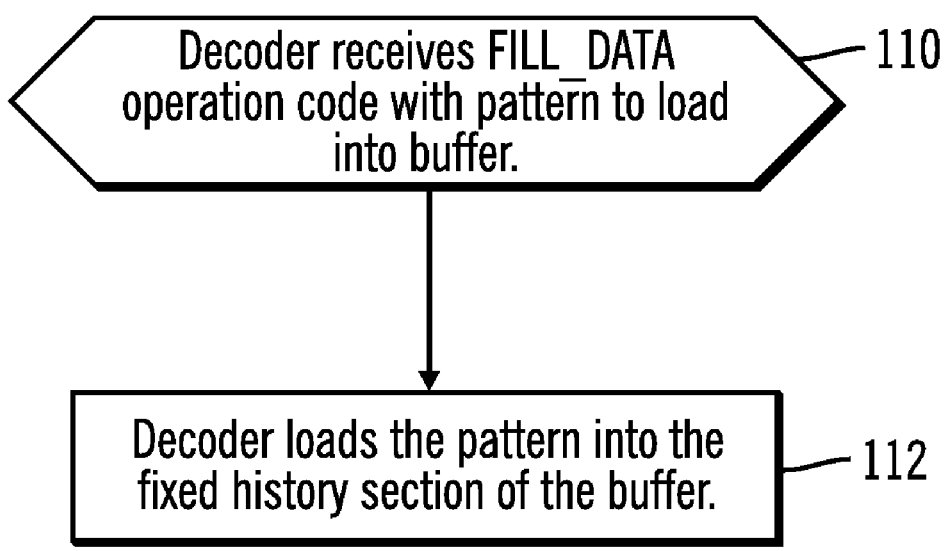
FIG. 5 illustrates an embodiment of operations performed by a decoder to load data into the buffer.

FIG. 5 illustrates an embodiment of operations the decoder 8 performs to add a pattern 50a . . . 50n (FIG. 3) to the buffer 12. Upon receiving (at block 110) an operation code (e.g., FILL_DATA) with a pattern 50a . . . 50n to load into the buffer 12, the decoder 8 loads (at block 112) the accompanying pattern 50a . . . 50n into the fixed history section 42 of the buffer. This operation code may specify an address or entry in the fixed history section 42 at which to add the pattern 50a . . . 50n, which may comprise any arrangement or number of pixels of data.

Figure 6:
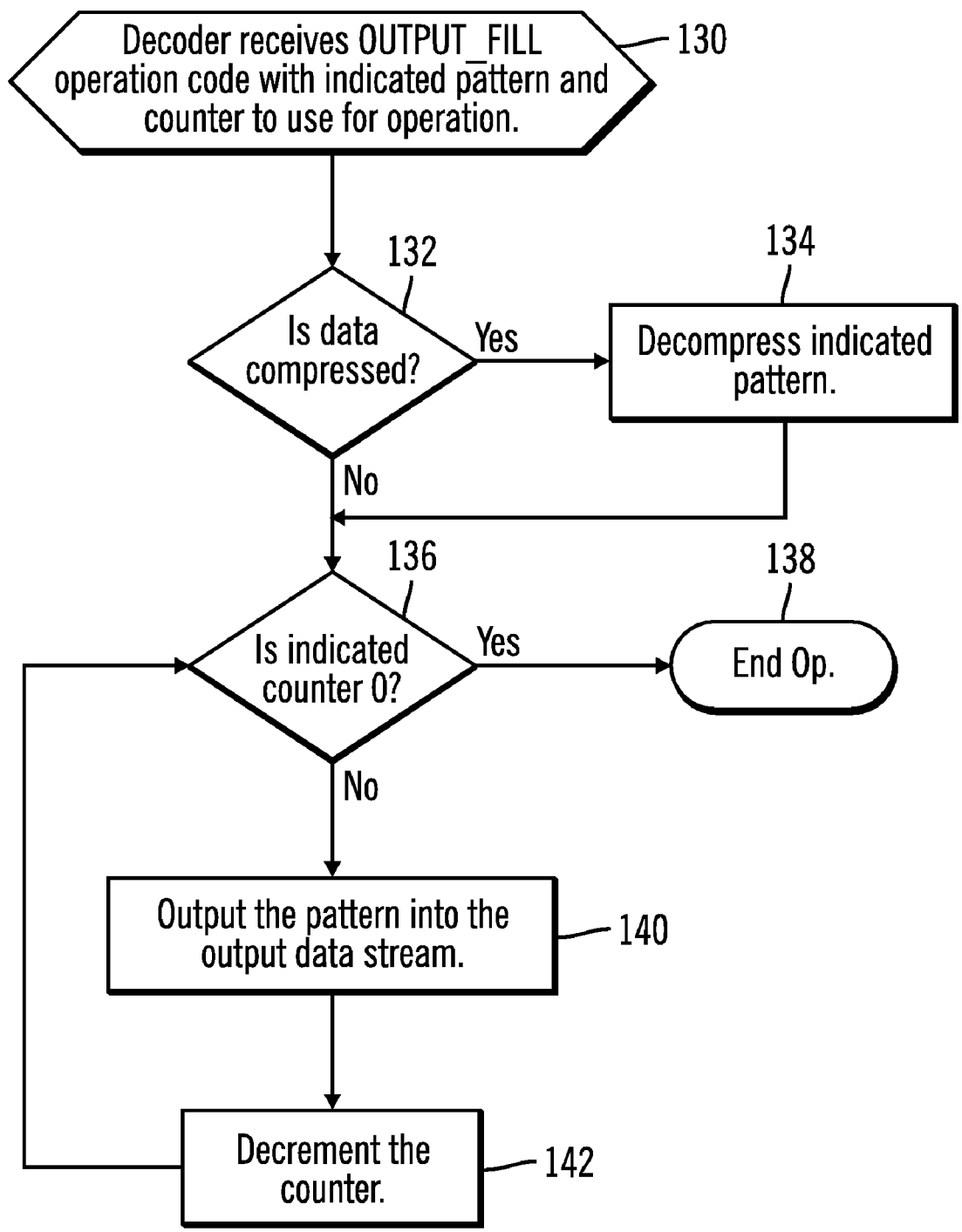
FIG. 6 illustrates an embodiment of operations performed by a decoder to output data from the buffer to an output data stream.

FIG. 6 illustrates an embodiment of operations the decoder 8 performs to output a pattern 50a . . . 50n into the output data stream 16. At block 130, the decoder receives an OUTPUT_FILL operation code from the encoder 6 with one indicated pattern 50a . . . 50n stored in the buffer and counter 54a . . . 54n to use for operation. If (at block 132) the data in the specified pattern is not compressed, then the decoder 8 decompresses (at block 134) the pattern 50a . . . 50n. If the data is compressed (from the yes branch of block 132) or after decompressing the data (at block 134), control proceeds to block 136. If (at block 136) the counter 54a . . . 54n is zero or otherwise indicates the operation was performed the requested number of times, then the operation ends (at block 138). If (at block 136) the counter 54a . . . 54n is not zero or otherwise indicates that there are more iterations of the operation to perform, then the decoder 8 outputs (at block 140) the indicated pattern 50a . . . 50n into the output data stream 16 and decrements (at block 142) the counter or otherwise indicates that there is one less iteration to perform. Control proceeds back to block 136 to determine whether there are further iterations to perform.

FIG. 7 illustrates an embodiment of operations the decoder 8 performs to buffer tab settings 48a . . . 48n (FIG. 3) in the tab section 40. Upon receiving (at block 180) tab operation codes with tab settings 48a . . . 48n, the decoder 8 stores (at block 182) each tab setting 48a . . . 48n in a tab section 40 of the buffer 12.

FIG. 8 illustrates an embodiment of operations the decoder 8 performs to process tab settings 48a . . . 48n (FIG. 3) in the tab section 40. Upon receiving (at block 190) an operation code specifying a horizontal and/or vertical tab in the input data stream 14, the decoder 8 determines (at block 191) from the tab settings 48a, 48b . . . 48n in the buffer 12 the specified data and the indicated (vertical and/or horizontal) position defined for the received tab. In one embodiment, the decoder 8 may select the tab setting 48a . . . 48n in the tab section 40 of the buffer that indicates the vertical and/or horizontal position that is the closest following position to the current position of the output. Alternatively, the tab operation code may specify a tab by identifying the tab or the tab's memory address in the tab section 40.

If (at block 192) the tab is horizontal, i.e., for the horizontal direction, then the decoder 8 outputs (at block 193) the specified data along the line (print direction) up to the indicated horizontal position on the line. Otherwise, if (at block 194) the tab is vertical, then the decoder 8 outputs (at block 195) the specified data from the current position up until the end of the line preceding the line at the indicated vertical position on the page. If the tab is both horizontal and vertical (from the no branch of block 194), then the decoder 8 outputs (at block 196) the specified data from the current position to the indicated horizontal and vertical position on the page.

With the tab setting embodiments of FIGS. 7 and 8, the encoder 6 need only specify the tab settings once and the decoder 8 will apply them to all lines of data until the encoder 6 changes the tab settings. In this way, the encoder 6 does not have to continually transmit the tab information to pad for each line of data. This reduces the size of the input data stream 16.

Figure 9:
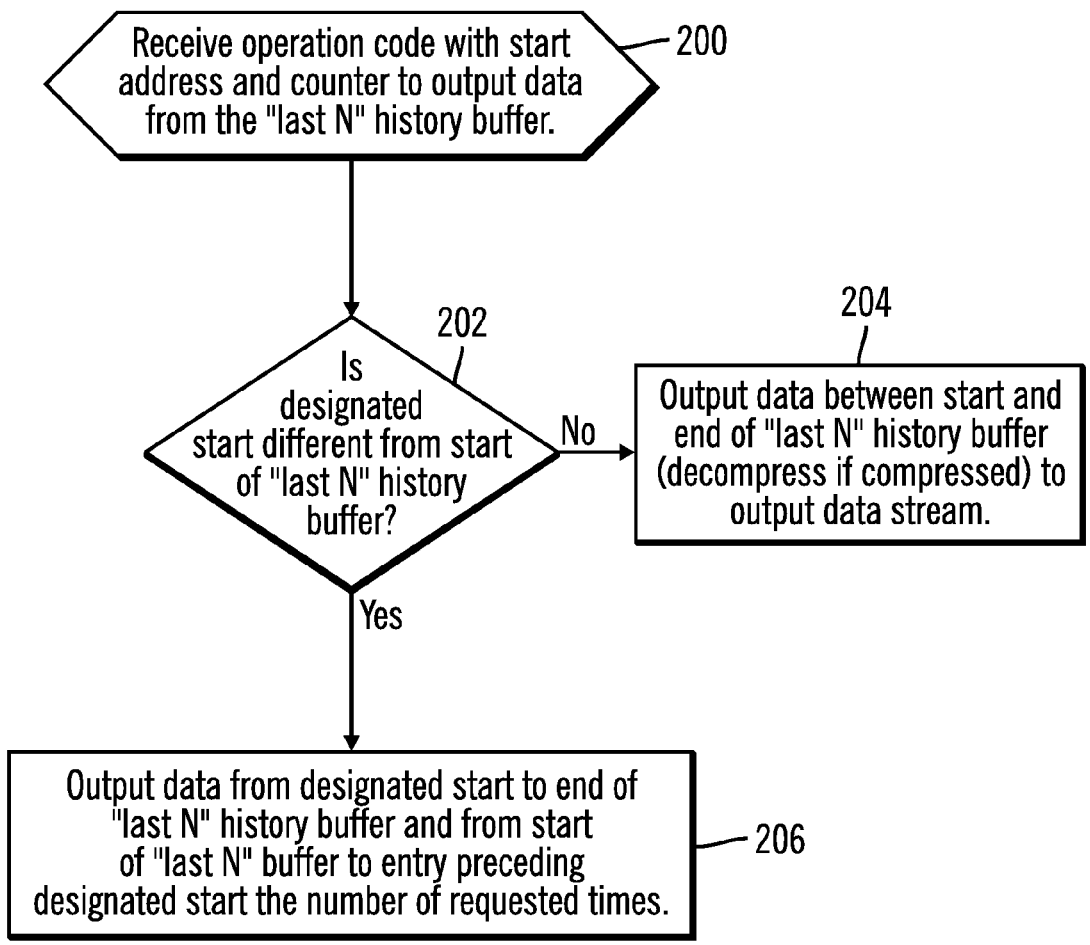
FIG. 9 illustrates an embodiment of operations performed by a decoder to output data from the buffer.

FIG. 9 illustrates an embodiment of operations performed by the decoder 8 to output data from the "last N" history buffer 44. Upon receiving (at block 200) the operation code to output data from the "last N" history buffer 44 with a start address (optional) and a counter 54a . . . 54n, the decoder 8 determines (at block 202) whether a start address was provided. If no, then the decoder 8 outputs (at block 204) the decompressed data from the "last N" history buffer 44 between the start (Hist_Start) and end (Hist_End) of the buffer 44 the number of requested times. Otherwise, if a start address was provided, then the decoder 8 outputs (at block 206) data from the designated start in the buffer 44 to the end (Hist_End) of the "last N" history buffer 44 and from the start (Hist_Start) of the "last N" buffer 44 to the entry preceding the designated start of the output operation.

Described embodiments provide operation codes an encoder 6 may use to control the decoder 8 to output data to an output data stream 16 and control how the decoder 8 buffers data in the decoder buffer 8 to use to output data to the output data stream 16. The described embodiments allow the encoder 6 to reduce the amount of compressed data that is be sent and decompressed by using operation codes to control the decoder to repeatedly output data and apply settings, such as tab settings, so that the encoder does not need to repeatedly send that data in the input data stream.

Additional Embodiment Details

The described operations may be implemented as a method, apparatus or article of manufacture using standard programming and/or engineering techniques to produce software, firmware, hardware, or any combination thereof. The described operations may be implemented as code maintained in a "computer readable medium", where a processor may read and execute the code from the computer readable medium. A computer readable medium may comprise media such as magnetic storage medium (e.g., hard disk drives, floppy disks, tape, etc.), optical storage (CD-ROMs, DVDs, optical disks, etc.), volatile and non-volatile memory devices (e.g., EEPROMs, ROMs, PROMs, RAMs, DRAMs, SRAMs, Flash Memory, firmware, programmable logic, etc.), etc. The code implementing the described operations may further be implemented in hardware logic (e.g., an integrated circuit chip, Programmable Gate Array (PGA), Application Specific Integrated Circuit (ASIC), etc.). Still further, the code implementing the described operations may be implemented in "transmission signals", where transmission signals may propagate through space or through a transmission media, such as an optical fiber, copper wire, etc. The transmission signals in which the code or logic is encoded may further comprise a wireless signal, satellite transmission, radio waves, infrared signals, Bluetooth, etc. The transmission signals in which the code or logic is encoded is capable of being transmitted by a transmitting station and received by a receiving station, where the code or logic encoded in the transmission signal may be decoded and stored in hardware or a computer readable medium at the receiving and transmitting stations or devices. An "article of manufacture" comprises computer readable medium, hardware logic, and/or transmission signals in which code may be implemented. A device in which the code implementing the described embodiments of operations is encoded may comprise a computer readable medium or hardware logic. Of course, those skilled in the art will recognize that many modifications may be made to this configuration without departing from the scope of the present invention, and that the article of manufacture may comprise suitable information bearing medium known in the art.

In described embodiments, the decoded data is supplied to a device comprising print engine to render on a print media. In an alternative embodiment, the device to which decoded data is supplied may comprise a file for storing the decoded data.

The integer value "n" is used to denote an integer number of an element and may have the same or different value when used with different elements or different instances of the same element.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The illustrated operations of FIGS. 4, 5, 6, 7, 8, and 9 show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method, comprising:
    generating, with an encoder, an input data stream to a decoder comprising at least one of a plurality of operation codes and compressed data for an output device, wherein one of the operation codes includes parameters indicating a counter size indicating a size of a counter and a counter value indicating an initial value for the counter;
    receiving, by the decoder, the input data stream;
    processing, by the decoder, the data in the input data stream to perform an operation with respect to a buffer according to the operation code including the parameters indicating the counter size by:
        creating the counter in the buffer having the counter size indicated in the parameters;
        setting the created counter to the counter value indicated in the parameters; and
        using the created counter to repeat an operation with respect to data from the input data stream in the buffer a number of times indicated in the counter; and
    decoding, by the decoder, the compressed data into decompressed data to send to an output data stream to the output device.

2. The method of claim 1, wherein the operation codes include a first group of at least one operation code instructing the decoder to set a start and end addresses of a circular buffer in the buffer and a second group of at least one operation code instructing the decoder to output data in the circular buffer between the set start and end addresses an indicated number of times into the output data stream.

3. The method of claim 2, wherein the second group of at least one operation code instructs the decoder to output data staffing from a designated address between the set start and end addresses in the circular buffer, wherein the decoder processes the data in the input data stream according to the operation code instructing the decoder to output data starting from the designated address by:
    outputting data between the designated address and the end address in the circular buffer and between start address and an address before the designated address the indicated number of times.

4. The method of claim 1, wherein the a operation codes include an operation code instructing the decoder to add a command to the buffer at an addressable location, wherein the decoder processes the data in the input data stream according to the operation code instructing the decoder to add the command to the buffer by storing the command in the buffer and further performing:
    receiving from the encoder the address of one command in the buffer to execute; and
    executing the command at the received address in the buffer to perform operations with respect to one of the input data stream or data in the buffer to output to the output device.

5. The method of claim 1, wherein the operation codes include operation codes instructing the decoder to:
    add a parameter to a first part of the buffer for use with one operation code subsequently sent by the encoder to the decoder;
    add a pattern of data to a second part of the buffer at an address, wherein the encoder subsequently sends at least one operation code to the decoder to output to the output data stream the pattern at the address in the second part of the buffer a designated number of times;
    control how the decoder buffers data from the input data stream in a third part of the buffer; and
    add a command to an address in a fourth part of the buffer, wherein the encoder subsequently sends the address of the command to cause the decoder to execute the command at the received address in the fourth part of the buffer.

6. The method of claim 1, wherein the operation codes include an operation code instructing the decoder to add halftone data generated from a halftone dither matrix to the buffer at an address, wherein the decoder processes the data in the input data stream according to the operation code instructing the decoder to add the halftone data by storing the halftone data in the buffer and further performing: receiving a halftone operation code to output the halftone data in the buffer.

7. The method of claim 6, wherein the halftone operation code designates a start location in the halftone data in the buffer, wherein the decoder outputs halftone data from the designated start location in the buffer to shift a halftone pattern represented by the halftone data.

8. A method, comprising:
    generating, with an encoder, an input data stream to a decoder comprising at least one operation code and compressed data for an output device, wherein the at least one operation code comprises at least one operation code instructing the decoder to add an accompanying pattern of data to buffer at an addressable location without outputting the received pattern to the output data stream;
    receiving, by the decoder, the input data stream;
    processing, by the decoder, wherein the decoder processes the data in the input data stream according to the at least one operation code by storing the pattern in the buffer in response to the operation code to add the accompanying pattern to the buffer;
    decoding, by the decoder, the compressed data into decompressed data to send to an output data stream to the output device;
    receiving the address of one pattern in the buffer; and ,
    outputting the pattern at the received address in the buffer to the output data stream.

9. A method, comprising:
generating, with an encoder, an input data stream to a decoder comprising least one operation code comprises a first and second operation codes;
receiving, by the decoder, the input data stream;
processing, by the decoder, the data in the input data stream to perform an operation with respect to a buffer, wherein the first operation code instructs the decoder to load or not to load data in the input data stream following the received first operation code into the buffer and wherein the second operation code instructs the decoder to output or not output decompressed data decompressed from the input data stream following the received second operation code into the output data stream to the output device data; and
decoding, by the decoder, the compressed data into decompressed data to send to an output data stream to the output device.

10. The method of claim 9, wherein the first and second operation codes may be received together to simultaneously start or stop adding subsequent data from the input data stream to the buffer and to start or stop outputting subsequent data from the input data stream to the output data stream to the output device.

11. The method of claim 9, wherein the first operation code instructs the decoder to load data from the input data stream to a designated address in the buffer.

* * * * *